(12) United States Patent
Okuley

(10) Patent No.: US 10,630,958 B2
(45) Date of Patent: Apr. 21, 2020

(54) TECHNOLOGIES FOR AUTOMATED PROJECTOR PLACEMENT FOR PROJECTED COMPUTING INTERACTIONS

(71) Applicant: Intel Corporation, Santa Clara, CA (US)

(72) Inventor: James M. Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 15/200,257

(22) Filed: Jul. 1, 2016

(65) Prior Publication Data

US 2018/0007341 A1    Jan. 4, 2018

(51) Int. Cl.
*G06T 7/521*  (2017.01)
*H04N 13/20*  (2018.01)
*H04N 13/271*  (2018.01)
*H04N 9/31*  (2006.01)
*G01S 17/89*  (2020.01)
*G06F 3/14*  (2006.01)
*G09G 3/00*  (2006.01)

(52) U.S. Cl.
CPC .............. *H04N 13/20* (2018.05); *G01S 17/89* (2013.01); *G06T 7/521* (2017.01); *H04N 9/3179* (2013.01); *H04N 9/3194* (2013.01); *H04N 13/271* (2018.05); *G06F 3/14* (2013.01); *G09G 3/002* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 7,394,459 | B2 * | 7/2008 | Bathiche | A63F 13/00 345/156 |
| 7,654,826 | B2 * | 2/2010 | Faulkner | G06T 17/05 434/130 |
| 7,826,641 | B2 * | 11/2010 | Mandella | G01B 11/002 345/166 |
| 9,418,479 | B1 * | 8/2016 | Worley, III | G01B 11/2513 |
| 9,723,248 | B1 * | 8/2017 | Colburn | H04N 5/7458 |
| 9,881,383 | B2 * | 1/2018 | Rueb | G06T 7/73 |

(Continued)

*Primary Examiner* — Chikaodili E Anyikire
(74) *Attorney, Agent, or Firm* — Barnes & Thornburg LLP

(57) ABSTRACT

Technologies for automated optimal projector placement include a computing device having a depth camera and a projector. The computing device scans an environment of a user of the computing device with the depth camera to generate an environment map and determines a projection surface for a projected computing interaction based on the environment map and a usability factor. The usability factor may include application requirements, ergonomic factors such as viewing angle or reach distance, surface visibility features, or other factors. The computing device determines a target location for the projector based on the projection surface and presents the target location to the user. The target location may be determined to avoid obstructions or based on a projected image feature size or quality of the projected computing interaction. The computing device may project an indication of the target location at the target location. Other embodiments are described and claimed.

25 Claims, 4 Drawing Sheets

(56) References Cited

U.S. PATENT DOCUMENTS

2014/0253589 A1* 9/2014 Tout ................ G06K 19/06159
    345/633
2016/0086379 A1* 3/2016 Sadi ..................... G06T 19/006
    345/633

* cited by examiner

TECHNOLOGIES FOR AUTOMATED PROJECTOR PLACEMENT FOR PROJECTED COMPUTING INTERACTIONS

BACKGROUND

Projector technology may be used to project images or other data onto screens, walls, and other environmental surfaces. Stationary projection systems have been used for projected computing applications. Projected computing may include projecting a user interface on one or more environmental surfaces and allowing the user to perform interactions with the user interface. For example, augmented reality projected computing applications may project labels, instructions, or other information onto objects or surfaces in a user's environment. Current digital projectors are becoming smaller with improved brightness, and certain projectors are portable and battery-powered.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
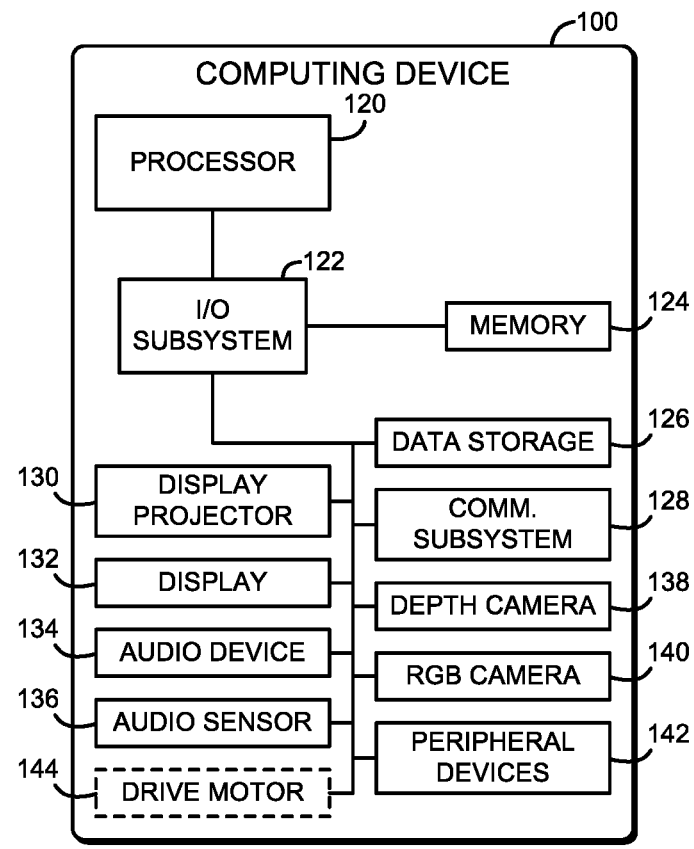
FIG. 1 is a simplified block diagram of at least one embodiment of a system for automated optimal projector placement.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for automated optimal projector placement includes a computing device 100 having a display projector 130 and a depth camera 138. In use, as described further below, the computing device 100 scans the environment of a user of the computing device 100 to generate an environment map. The computing device 100 determines a target location for the projector 130 that will provide an optimal user experience for projected computing interactions. The computing device 100 presents the target location to the user, for example by causing the projector 130 to project a visual indication at the target location. The user moves the computing device 100 to the target location, and then the computing device 100 may then provide projected computing interactions (e.g., execute an augmented reality application) while providing an optimal user experience. Thus, the computing device 100 may provide for an optimal user experience when the computing device 100 is initially set up or moved between locations. In some embodiments, the target location may be determined to provide an optimal user experience for a particular projected computing application. By performing an automated technique to optimize the user experience, the computing device 100 may encourage even inexperienced users to use projected computing applications.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, an ambient computing device, a network appliance, a web appliance, a distributed computing system, a processor-based system, and/or a consumer electronic device. As shown in FIG. 1, the computing device 100 illustratively includes a processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices directly or over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

The computing device 100 may also include a display projector 130, a display 132, an audio device 134, an audio sensor 136, a depth camera 138, and an RGB camera 140. The display projector 130 may be embodied as any type of projector capable of projecting digital image information onto surfaces and/or objects in the environment. The display projector 130 may include components such as a lens, a light source, and an image creation element such as a liquid crystal display (LCD), a light emitting diode (LED), or other type of display device. Similarly, the display 132 may be embodied as any type of display capable of displaying digital information, such as a liquid crystal display (LCD), a light emitting diode (LED), a plasma display, a cathode ray tube (CRT), or other type of display device.

The audio device 134 may be embodied as any device capable of generating audio signals for output, such as a paper cone speaker, an audio transducer, an audio output jack, a digital-to-analog converter (DAC), or other type of audio device. The audio sensor 136 may be embodied as any sensor capable of capturing audio signals such as one or more microphones, a line input jack and associated circuitry, an analog-to-digital converter (ADC), or other type of audio sensor. The audio sensor 136 may be used, for example, to capture voice input spoken by the user of the computing device 100.

The depth camera 138 may be embodied as any type of active or passive electronic sensor capable of detecting the location of objects in the environment of the computing device 100. Illustratively, the depth camera 138 is a time-of-flight depth camera; however, in other embodiments the depth camera 138 may be embodied as a stereoscopic depth camera, a structured light camera, an infrared proximity sensor, and/or any other distance measuring device. In some embodiments, the depth camera 138 may be capable of capturing 360-degree environmental depth information. For example, in some embodiments the computing device 100 may rotate the depth camera 138 and/or the depth camera 138 may include a parabolic mirror for collecting wide-angle depth information.

The RGB camera 140 may be embodied as a digital camera or other digital imaging device integrated with the computing device 100 or otherwise communicatively coupled thereto. The RGB camera 140 includes an electronic image sensor, such as an active-pixel sensor (APS), e.g., a complementary metal-oxide-semiconductor (CMOS) sensor, or a charge-coupled device (CCD). The RGB camera 140 may be used to capture image data including, in some embodiments, capturing still images or video images.

As shown, the computing device 100 may also include one or more peripheral devices 142. The peripheral devices 142 may include any number of additional input/output devices, interface devices, and/or other peripheral devices. For example, in some embodiments, the peripheral devices 142 may include a display, touch screen, graphics circuitry, keyboard, mouse, speaker system, microphone, network interface, and/or other input/output devices, interface devices, and/or peripheral devices.

In some embodiments, the computing device 100 may also include one or more drive motors 144. The drive motors 144 may be used to move the computing device 100. For example, the drive motors 144 may be coupled to one or more wheels and used to move the computing device 100 to different locations on a surface.

Additionally or alternatively, although illustrated as a single computing device 100, it should be understood that in some embodiments, the functionality of the computing device 100 may be performed by two or more devices. For example, in some embodiments the computing device 100 may communicate with an external projector device to perform the functions described herein. The computing device 100 may communicate with the projector device via a wired connection, a wireless communication network, and/or via a direct wireless communication link.

Figure 2:
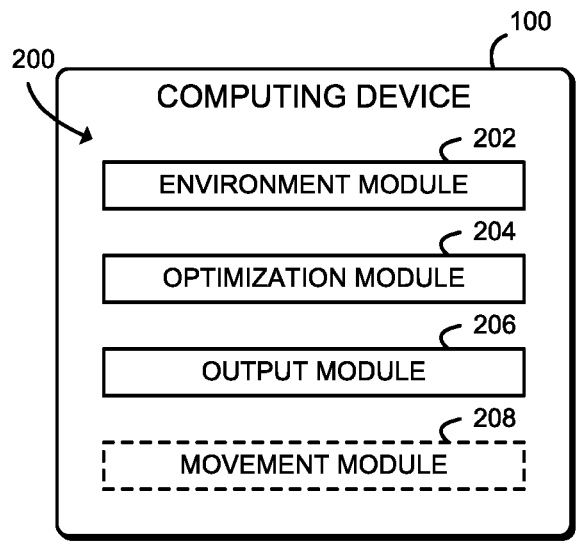
FIG. 2 is a simplified block diagram of at least one embodiment of an environment that may be established by a computing device of FIG. 1.

Referring now to FIG. 2, in an illustrative embodiment, the computing device 100 establishes an environment 200 during operation. The illustrative environment 200 includes an environment module 202, an optimization module 204, an output module 206, and, in some embodiments, a movement module 208. The various modules of the environment 200 may be embodied as hardware, firmware, software, or a combination thereof. As such, in some embodiments, one or more of the modules of the environment 200 may be embodied as circuitry or collection of electrical devices (e.g., environment circuitry 202, optimization circuitry 204, output circuitry 206, and/or movement circuitry 208). It should be appreciated that, in such embodiments, one or more of the environment circuitry 202, the optimization circuitry 204, the output circuitry 206, and/or the movement circuitry 208 may form a portion of one or more of the processor 120, the I/O subsystem 122, and/or other components of the computing device 100. Additionally, in some embodiments, one or more of the illustrative modules may form a portion of another module and/or one or more of the illustrative modules may be independent of one another.

The environment module 202 is configured to scan an environment of a user of the computing device 100 with the depth camera 138 to generate an environment map. Scanning the environment may include identifying the user of the computing device 100, identifying environmental objects, and/or identifying environmental surfaces in the environment of the user.

The optimization module 204 is configured to determine a projection surface for a projected computing interaction based on the environment map and a usability factor of the projected computing interaction. The usability factor may be embodied as a user ergonomics factor such as a viewing angle between the user and the projection surface or a reach distance between the user and the projection surface. The usability factor may also be embodied as a usability requirement of a projected computing application associated with the projected computing interaction, or as a visibility feature of the projection surface. The optimization module 204 is further configured to determine a target location for the projector 130 based on the projection surface and the environment map. The target location may be determined, for example, to avoid an obstruction between the projector 130 and the projection surface or based on a projected image feature size of the projected computing interaction.

The output module 206 is configured to present the target location to the user of the computing device 100. Presenting the target location may include, for example, projecting an indicator of the target location at the target location using the projector 130, outputting an audible indicator of the target location, or outputting a graphical display of the target location with the display 132.

The movement module 208 is configured to move the computing device 100 to the target location with the drive motor 144. For example, as described above, the computing device 100 may include one or more motorized wheels or other movement devices.

Figure 3:
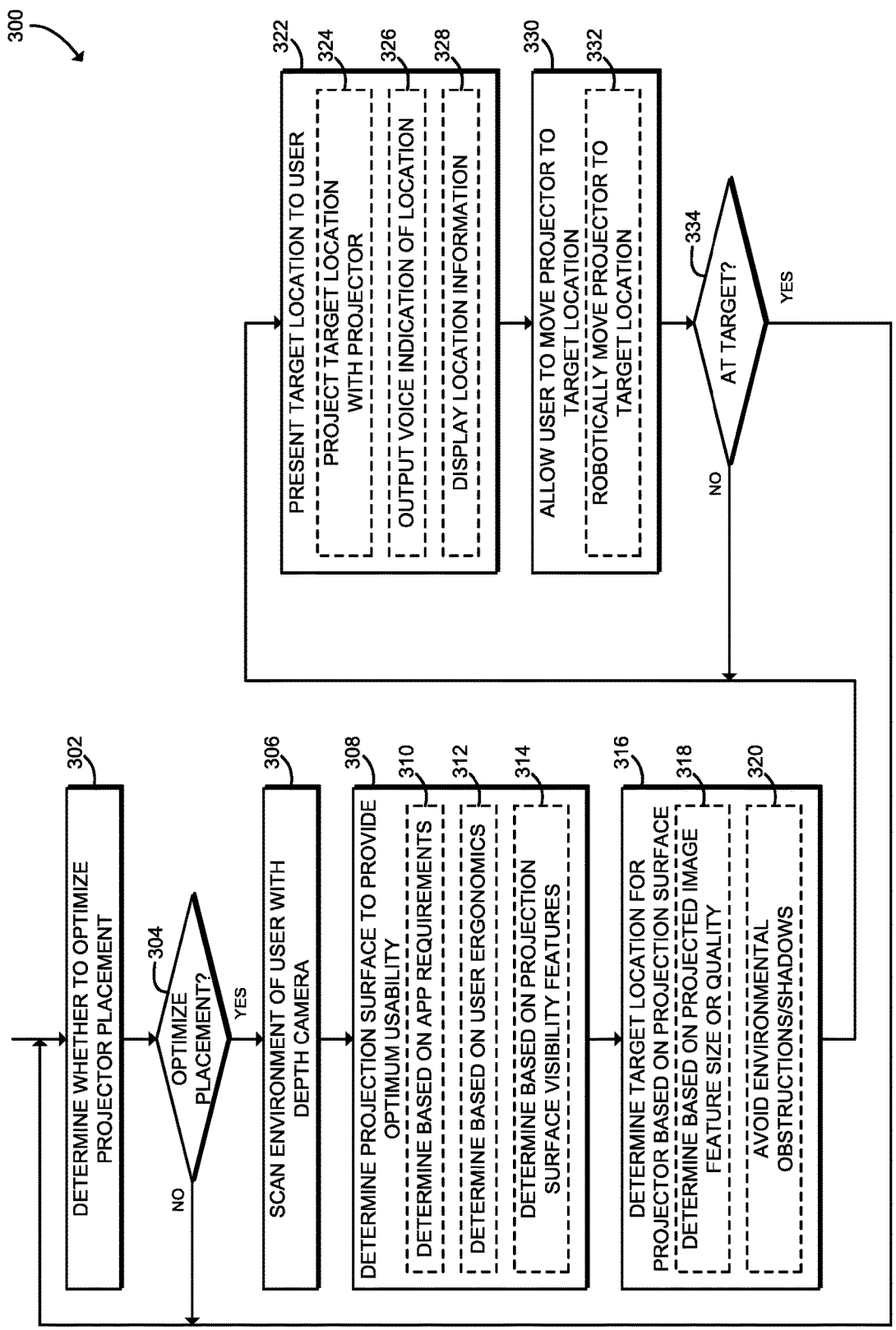
FIG. 3 is a simplified flow diagram of at least one embodiment of a method for automated optimal projector placement that may be executed by the computing device of FIGS. 1-2.

Referring now to FIG. 3, in use, the computing device 100 may execute a method 300 for automated optimal projector placement. It should be appreciated that, in some embodiments, the operations of the method 300 may be performed by one or more modules of the environment 200 of the computing device 100 as shown in FIG. 2. The method 300 begins in block 302, in which the computing device 100 determines whether to optimize placement of the projector 130. The computing device 100 may optimize projector placement, for example, in response to powering on the computing device 100 or moving the computing device 100 to a new location (e.g., a new room). In some embodiments, the computing device 100 may optimize projector placement in response to launching a new application. In block 304, the computing device 100 checks whether to optimize placement. If not, the method 300 loops back to block 302 to continue determining whether to optimize placement. If the computing device 100 determines to optimize placement, the method 300 advances to block 306.

In block 306, the computing device 100 scans the environment of a user of the computing device 100 using the depth camera 138. The computing device 100 generates a map of the environment, including distances to various objects in the environment, including surfaces, the user, and other objects. Based on the environment map, the computing device 100 may identify a location of the user of the computing device 100 as well as one or more surfaces (e.g., walls, tables, countertops, or other flat surfaces) and objects in the environment. In some embodiments, the computing device 100 may perform object recognition and recognize various objects in the environment, using the environment map as well as other data, such as image data captured by the RGB camera 140.

In block 308, the computing device 100 determines a projection surface for a projected computing interaction that provides optimal usability. The projected computing interaction may include any technique for displaying information such as graphics, text, user interface elements, or other visual information in the environment of the user. For example, the projected computing interaction may include displaying a user interface to the user with the projector 130 and/or detecting input from the user. User input may include gesture and/or touch input detected using the depth camera 138, speech input detected using the audio sensor 136, and/or other user input modalities. Determining the projection surface may include identifying a particular surface or object in the environment (e.g., a wall, floor, table, or other surface) and/or a part of a surface or object for projecting the visual information. The computing device 100 may select the projection surface that provides optimal usability by attempting to maximize one or more usability factors, including application requirements, ergonomic factors, and/or surface visibility features.

In some embodiments, in block 310, the computing device 100 may determine the projection surface based on one or more requirements of a projected computing application currently being used by the user. For example, in a projected floor game application, the projection surface may be optimized for multiple users and furniture obstructions. As another example, for a cooking application, the projection surface may be chosen based on counter space, tools, containers, and/or ingredients required for a particular recipe. In some embodiments, in block 312, the projection surface may be based on user ergonomics. For example, the projection surface may be selected based on the viewing angle between the user and each surface. The computing device 100 may determine the location of the user's head and/or gaze angle and identify a projection surface that is visible to the user. As another example, the projection surface may be selected based on the distance between the user and the projection surface, to allow the user to reach the surface to perform gestures, touch interaction, and/or other tasks. As described above, the location of the user may also be determined with the depth camera 138. In some embodiments, in block 314 the projection surface may be selected based on visibility features of the projection surface. For example, the computing device 100 may select a projection surface upon which the projector 130 may display a high-contrast image. The computing device 100 may consider, for example, the color of the projection surface, the environmental light brightness of the projection surface, or other visibility features. The visibility features may be determined, for example, using the RGB camera 140. In some embodiments, the computing device 100 may adjust the projected computing interaction based on the visibility features to improve the user experience, for example adjusting one or more projected colors to improve visual contrast against the projection surface.

In block 316, the computing device 100 determines a target location for the projector 130 in the environment based on the determined projection surface. The computing device 100 may, for example, determine a flat surface within the environment from which the projector 130 is capable of projecting an image on the projection surface. In some embodiments, in block 318, the computing device 100 may determine the target location based on projected image feature size and/or quality. For example, the computing device 100 may select the target location at a particular distance from the projection surface such that visual features produced by the projector 130, such as text, images, or user interface controls, may be comfortably viewed by the user. As another example, the computing device 100 may select a target location that is close enough to the projection surface for the projector 130 to provide a sufficiently bright projected image. In some embodiments, in block 320 the computing device 100 may determine a target location that avoids environmental obstructions and resulting shadows. For example, the computing device 100 may select a target location that has an unobstructed line of sight to the projection surface.

In block 322, the computing device 100 presents the target location of the projector 130 to the user. The computing device 100 may use any technique to inform the user of the target location. In some embodiments, in block 324 the computing device 100 may project the target location with the projector 130. For example, the computing device 100 may use the projector 130 to project an image at the target location, so that the user can identify the target location. As another example, in some embodiments, in block 326 the computing device 100 may output a voice indication of the target location using the audio device 134. For example, the computing device 100 may output audible instructions identifying the target location. As another example, in some embodiments in block 328 the computing device 100 may display the location information on the display 132. The displayed location may be embodied as, for example, a map of the current room including a symbol indicating the target location.

In block 330, the computing device 100 allows the user to move the projector 130 (and in some embodiments the computing device 100) to the target location. In some embodiments, the computing device 100 may monitor the location of the projector 130 to determine whether the projector 130 has been moved to the target location. As the projector 130 is moved to the target location, in some embodiments the computing device 100 may update the indication of the target location, for example tracking the target location and adjusting the projector 130 so that the indication of the target location remains projected at the target location. In some embodiments, in block 332 the computing device 100 may robotically move the projector 130 to the target location. For example, in some embodiments the computing device 100 may cause the drive motor(s) 144 of the computing device 100 to move the projector 130 to the target location. As described above, the computing device 100 may include one or more motorized wheels or other movement devices to move the projector 130. As another example, an external robotic device such as a robot arm may move the projector 130 to the target location.

In block 334, the computing device 100 determines whether the projector 130 is at the target location. If not, the method 300 loops back to block 322, in which the computing device 100 continues to present the target location to the user. As described above, the computing device 100 may continually update the presentation of the target location as the user moves the projector 130 to the target location. If the projector 130 is at the target location, the method 300 loops back to block 302, in which the computing device 100 continues to determine whether to optimize projector placement. After being located at the target location, the computing device 100 may project display information for one or more projected computing interactions using the projector 130 onto the projection surface determined as described above. For example, the computing device 100 may project text, images, video, user interface controls, augmented reality data, or other visual information. Additionally, although illustrated as monitoring whether the projector 130 is located at the target location, in some embodiments the computing device 100 may simply present the target location to the user without monitoring whether the projector 130 is moved to the target location.

Figure 4:
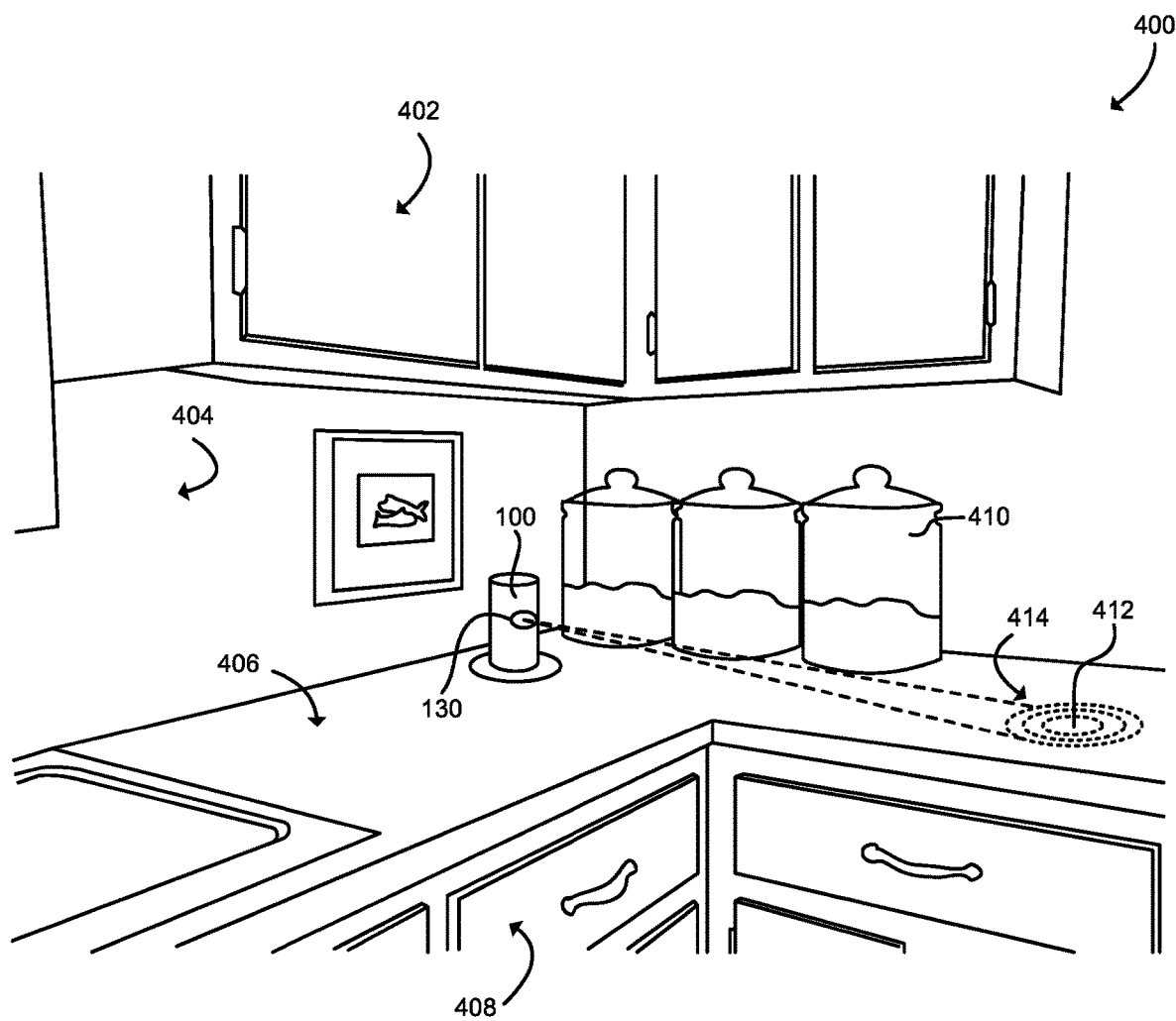
FIG. 4 is a schematic diagram illustrating a target projector location that may be projected by the system of FIG. 1.

Referring now to FIG. 4, diagram 400 illustrates the computing device 100 located in an environment of the user, which is illustratively a kitchen. The illustrative environment includes multiple surfaces that may be used to display projected computing interfaces, including an upper cabinet 402, a wall 404, a countertop 406, and a lower cabinet 408. The illustrative environment also includes objects that may obstruct certain surfaces and/or may be used to display projected computing interfaces, including jars 410. As described above, the computing device 100 may determine a target location 412 for optimal projector 130 placement. In the illustrative embodiment, the projector 130 projects a projection 414 at the target location 412. The user may move the computing device 100 with the projector 130 to the target location 412. Although illustrated as being stationary, as described above, the computing device 100 may continue to project the projection 414 at the target location 412 as the user picks up the computing device 100 and moves the computing device 100 to the target location 412.

Figure 5:
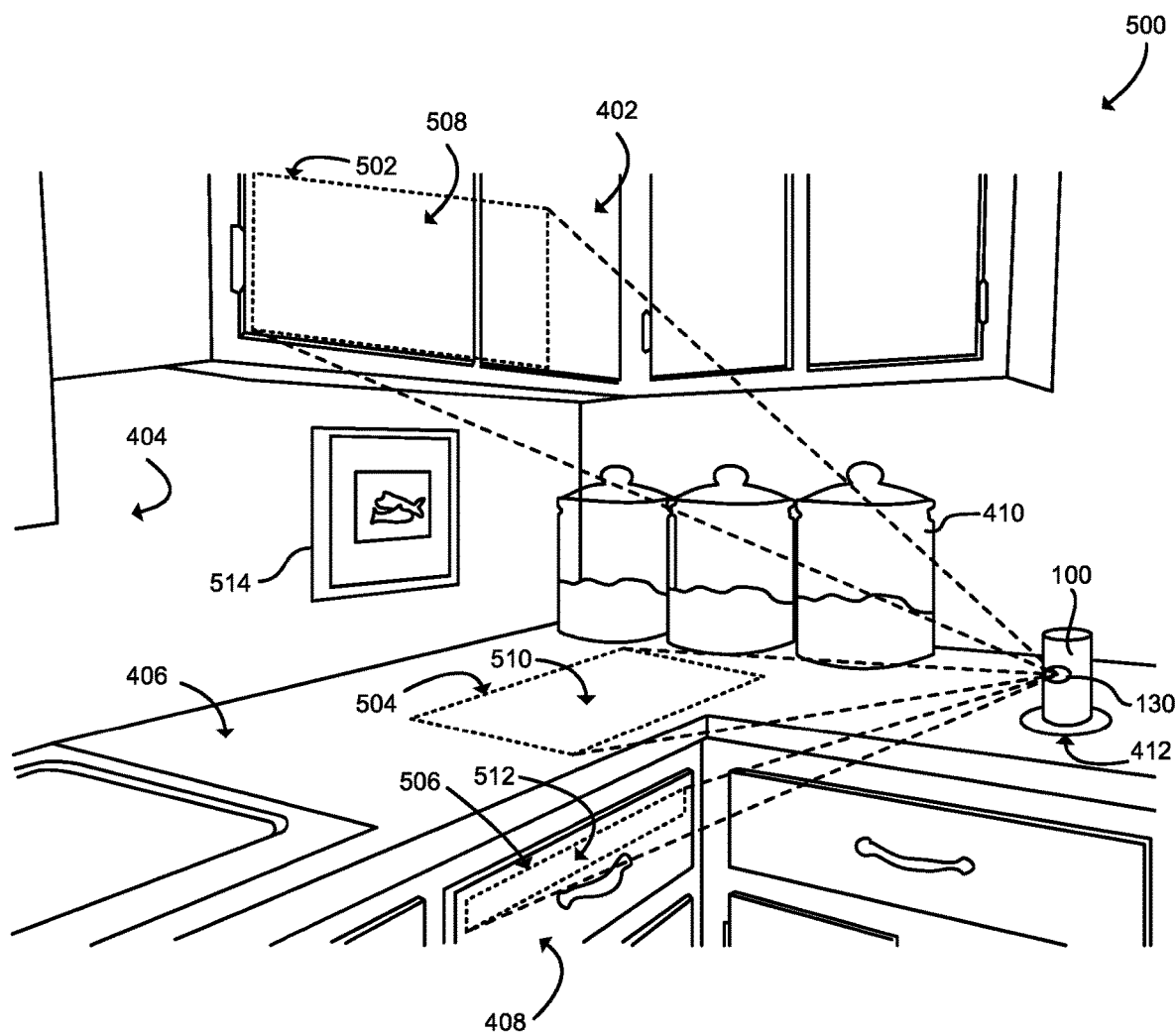
FIG. 5 is a schematic diagram illustrating projected computing interactions that may be performed by the system of FIG. 1.

Referring now to FIG. 5, diagram 500 illustrates the computing device 100 located at the target location 412. As shown, the computing device 100 may use the projector 130 to project one or more projections 502, 504, 506 to display projected computing interactions to the user. For example, the projection 502 may project information on a projection surface 508 on the upper cabinet 402. Illustratively, the projection surface 508 may be selected based on the viewing angle to the user. As another example, the projection 504 may project information on a projection surface 510 on the countertop 406. Illustratively, the projection surface 510 may be selected based on the reach distance of the user, allowing the user to touch, perform gestures, and manipulate objects on the countertop 406. As another example, the projection 506 may project information on a projection surface 512 on the lower cabinet 408. Illustratively, the projection surface 512 may be selected based on one or more application requirements. For example, for a cooking application, the cooking application may be loaded with information on the locations of various tools and/or ingredients, and the projection surface 512 may indicate where the tools and/or ingredients used for a particular recipe may be found. As another example, the computing device 100 may display a computing interaction on one or more objects in the environment, such as the jars 410. Continuing the previous example, the cooking application may display labels or other information on the jars 410 to identify tools and/or ingredients. As shown in FIG. 5, the computing device 100 may not project a projection surface on the wall 404. The computing device 100 may determine that the upper cabinet 402 provides a higher-quality projection experience, for example providing higher contrast without visual interference caused by the painting 514.

It should be appreciated that, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 124, the data storage device 126, firmware devices, other memory or data storage devices of the computing device 100, portable media readable by a peripheral device 142 of the computing device 100, and/or other media.

EXAMPLES

Illustrative examples of the technologies disclosed herein are provided below. An embodiment of the technologies may include any one or more, and any combination of, the examples described below.

Example 1 includes a computing device for projector positioning, the computing device comprising: a depth camera; a projector; an environment module to scan an environment of a user of the computing device with the depth camera to generate an environment map; an optimization module to (i) determine a projection surface for a projected computing interaction based on the environment map and a usability factor of the projected computing interaction, and (ii) determine a target location for the projector based on the projection surface and the environment map; and an output module to present the target location to the user of the computing device.

Example 2 includes the subject matter of Example 1, and wherein the depth camera comprises a time-of-flight depth camera.

Example 3 includes the subject matter of any of Examples 1 and 2, and wherein to scan the environment comprises to identify the user of the computing device, environmental objects, and environmental surfaces in the environment of the user.

Example 4 includes the subject matter of any of Examples 1-3, and wherein the usability factor comprises a user ergonomics factor.

Example 5 includes the subject matter of any of Examples 1-4, and wherein the user ergonomics factor comprises a viewing angle between the user and the projection surface.

Example 6 includes the subject matter of any of Examples 1-5, and wherein the user ergonomics factor comprises a reach distance between the user and the projection surface.

Example 7 includes the subject matter of any of Examples 1-6, and wherein the usability factor comprises a usability requirement of a projected computing application associated with the projected computing interaction.

Example 8 includes the subject matter of any of Examples 1-7, and wherein the usability factor comprises a visibility feature of the projection surface.

Example 9 includes the subject matter of any of Examples 1-8, and further comprising adjusting an interface color of the projected computing interaction based on the visibility feature of the projection surface.

Example 10 includes the subject matter of any of Examples 1-9, and wherein to determine the target location for the projector comprises to avoid an obstruction between the projector and the projection surface.

Example 11 includes the subject matter of any of Examples 1-10, and wherein to determine the target location for the projector comprises to determine the target location based on a projected image feature size of the projected computing interaction.

Example 12 includes the subject matter of any of Examples 1-11, and wherein to present the target location comprises to project an indicator of the target location at the target location with the projector.

Example 13 includes the subject matter of any of Examples 1-12, and wherein to present the target location comprises to output an audible indicator of the target location.

Example 14 includes the subject matter of any of Examples 1-13, and wherein to present the target location comprises to output a graphical display of target location.

Example 15 includes the subject matter of any of Examples 1-14, and further comprising a movement module to move the computing device to the target location with a motor of the computing device.

Example 16 includes a method for projector positioning, the method comprising: scanning, by a computing device, an environment of a user of the computing device using a depth camera of the computing device to generate an environment map; determining, by the computing device, a projection surface for a projected computing interaction based on the environment map and a usability factor of the projected computing interaction; determining, by the computing device, a target location for a projector of the computing device based on the projection surface and the environment map; and presenting, by the computing device, the target location to the user of the computing device.

Example 17 includes the subject matter of Example 16, and wherein scanning the environment using the depth camera comprises scanning the environment using a time-of-flight depth camera.

Example 18 includes the subject matter of any of Examples 16 and 17, and wherein scanning the environment comprises identifying the user of the computing device, environmental objects, and environmental surfaces in the environment of the user.

Example 19 includes the subject matter of any of Examples 16-18, and wherein determining the projection surface based on the usability factor comprises determining the projection surface based on a user ergonomics factor.

Example 20 includes the subject matter of any of Examples 16-19, and wherein determining the projection surface based on the user ergonomics factor comprises determining the projection surface based on a viewing angle between the user and the projection surface.

Example 21 includes the subject matter of any of Examples 16-20, and wherein determining the projection surface based on the user ergonomics factor comprises determining the projection surface based on a reach distance between the user and the projection surface.

Example 22 includes the subject matter of any of Examples 16-21, and wherein determining the projection surface based on the usability factor comprises determining the projection surface based on a usability requirement of a projected computing application associated with the projected computing interaction.

Example 23 includes the subject matter of any of Examples 16-22, and wherein determining the projection surface based on the usability factor comprises determining the projection surface based on a visibility feature of the projection surface.

Example 24 includes the subject matter of any of Examples 16-23, and further comprising adjusting an interface color of the projected computing interaction based on the visibility feature of the projection surface.

Example 25 includes the subject matter of any of Examples 16-24, and wherein determining the target location for the projector comprises avoiding an obstruction between the projector and the projection surface.

Example 26 includes the subject matter of any of Examples 16-25, and wherein determining the target location for the projector comprises determining the target location based on a projected image feature size of the projected computing interaction.

Example 27 includes the subject matter of any of Examples 16-26, and wherein presenting the target location comprises projecting an indicator of the target location at the target location using the projector.

Example 28 includes the subject matter of any of Examples 16-27, and wherein presenting the target location comprises outputting an audible indicator of the target location.

Example 29 includes the subject matter of any of Examples 16-28, and wherein presenting the target location comprises outputting a graphical display of target location.

Example 30 includes the subject matter of any of Examples 16-29, and further comprising moving, by the computing device, to the target location using a motor of the computing device.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for projector positioning, the computing device comprising: means for scanning an environment of a user of the computing device using a depth camera of the computing device to generate an environment map; means for determining a projection surface for a projected computing interaction based on the environment map and a usability factor of the projected computing interaction; means for determining a target location for a projector of the computing device based on the projection surface and the environment map; and means for presenting the target location to the user of the computing device.

Example 35 includes the subject matter of Example 34, and wherein the means for scanning the environment using the depth camera comprises means for scanning the environment using a time-of-flight depth camera.

Example 36 includes the subject matter of any of Examples 34 and 35, and wherein the means for scanning the environment comprises means for identifying the user of the computing device, environmental objects, and environmental surfaces in the environment of the user.

Example 37 includes the subject matter of any of Examples 34-36, and wherein the means for determining the projection surface based on the usability factor comprises means for determining the projection surface based on a user ergonomics factor.

Example 38 includes the subject matter of any of Examples 34-37, and wherein the means for determining the projection surface based on the user ergonomics factor comprises means for determining the projection surface based on a viewing angle between the user and the projection surface.

Example 39 includes the subject matter of any of Examples 34-38, and wherein the means for determining the projection surface based on the user ergonomics factor comprises means for determining the projection surface based on a reach distance between the user and the projection surface.

Example 40 includes the subject matter of any of Examples 34-39, and wherein the means for determining the projection surface based on the usability factor comprises means for determining the projection surface based on a usability requirement of a projected computing application associated with the projected computing interaction.

Example 41 includes the subject matter of any of Examples 34-40, and wherein the means for determining the projection surface based on the usability factor comprises means for determining the projection surface based on a visibility feature of the projection surface.

Example 42 includes the subject matter of any of Examples 34-41, and further comprising means for adjusting an interface color of the projected computing interaction based on the visibility feature of the projection surface.

Example 43 includes the subject matter of any of Examples 34-42, and wherein the means for determining the target location for the projector comprises means for avoiding an obstruction between the projector and the projection surface.

Example 44 includes the subject matter of any of Examples 34-43, and wherein the means for determining the target location for the projector comprises means for determining the target location based on a projected image feature size of the projected computing interaction.

Example 45 includes the subject matter of any of Examples 34-44, and wherein the means for presenting the target location comprises means for projecting an indicator of the target location at the target location using the projector.

Example 46 includes the subject matter of any of Examples 34-45, and wherein the means for presenting the target location comprises means for outputting an audible indicator of the target location.

Example 47 includes the subject matter of any of Examples 34-46, and wherein the means for presenting the target location comprises means for outputting a graphical display of target location.

Example 48 includes the subject matter of any of Examples 34-47, and further comprising means for moving to the target location using a motor of the computing device.

The invention claimed is:
1. A computing device for projector positioning, the computing device comprising:
   a depth camera;
   a projector;
   an environment module to scan an environment of a user of the computing device with the depth camera to generate an environment map;
   an optimization module to (i) determine a projection surface for a projected computing interaction based on the environment map and a usability factor of the projected computing interaction, and (ii) determine a target projector placement location in the environment of the user, wherein the target projector placement location identifies a location of the projector at which the projector is to project the projected computing interaction from the target projector placement location to the projection surface based on the projection surface and the environment map, wherein the target projector placement location is different from a current location of the projector; and an output module to present the target projector placement location to the user of the computing device.

2. The computing device of claim 1, wherein the depth camera comprises a time-of-flight depth camera.

3. The computing device of claim 1, wherein to scan the environment comprises to identify the user of the computing device, environmental objects, and environmental surfaces in the environment of the user.

4. The computing device of claim 1, wherein the usability factor comprises a user ergonomics factor.

5. The computing device of claim 4, wherein the user ergonomics factor comprises a viewing angle between the user and the projection surface.

6. The computing device of claim 4, wherein the user ergonomics factor comprises a reach distance between the user and the projection surface.

7. The computing device of claim 1, wherein the usability factor comprises a usability requirement of a projected computing application associated with the projected computing interaction.

8. The computing device of claim 1, wherein the usability factor comprises a visibility feature of the projection surface.

9. The computing device of claim 8, further comprising adjusting an interface color of the projected computing interaction based on the visibility feature of the projection surface.

10. The computing device of claim 1, wherein to determine the target location for the projector comprises to avoid an obstruction between the projector and the projection surface.

11. The computing device of claim 1, wherein to determine the target location for the projector comprises to determine the target location based on a projected image feature size of the projected computing interaction.

12. The computing device of claim 1, wherein to present the target location comprises to project an indicator of the target location at the target location with the projector.

13. The computing device of claim 1, further comprising a movement module to move the computing device in translation to the target location with a motor of the computing device.

14. A method for projector positioning, the method comprising:
scanning, by a computing device, an environment of a user of the computing device using a depth camera of the computing device to generate an environment map;
determining, by the computing device, a projection surface for a projected computing interaction based on the environment map and a usability factor of the projected computing interaction;
determining, by the computing device, a target projector placement location in the environment of the user, wherein the target projector placement location identifies a location of a projector at which the projector of the computing device is to project the projected computing interaction from the target projector placement location to the projection surface based on the projection surface and the environment map, wherein the target projector placement location is different from a current location of the projector; and presenting, by the computing device, the target projector placement location to the user of the computing device.

15. The method of claim 14, wherein scanning the environment using the depth camera comprises scanning the environment using a time-of-flight depth camera.

16. The method of claim 14, wherein determining the projection surface based on the usability factor comprises determining the projection surface based on a user ergonomics factor.

17. The method of claim 14, wherein determining the projection surface based on the usability factor comprises determining the projection surface based on a usability requirement of a projected computing application associated with the projected computing interaction.

18. The method of claim 14, wherein determining the projection surface based on the usability factor comprises determining the projection surface based on a visibility feature of the projection surface.

19. The method of claim 14, wherein presenting the target location comprises projecting an indicator of the target location at the target location using the projector.

20. One or more non-transitory, computer-readable storage media comprising a plurality of instructions that in response to being executed cause a computing device to:
scan an environment of a user of the computing device using a depth camera of the computing device to generate an environment map;
determine a projection surface for a projected computing interaction based on the environment map and a usability factor of the projected computing interaction;
determine a target projector placement location in the environment of the user, wherein the target projector placement location identifies a location of a projector at which the projector of the computing device is to project the projected computing interaction from the target projector placement location to the projection surface based on the projection surface and the environment map, wherein the target projector placement location is different from a current location of the projector; and
present the target location to the user of the computing device.

21. The one or more non-transitory, computer-readable storage media of claim 20, wherein to scan the environment using the depth camera comprises to scan the environment using a time-of-flight depth camera.

22. The one or more non-transitory, computer-readable storage media of claim 20, wherein to determine the projection surface based on the usability factor comprises to determine the projection surface based on a user ergonomics factor.

23. The one or more non-transitory, computer-readable storage media of claim 20, wherein to determine the projection surface based on the usability factor comprises to determine the projection surface based on a usability requirement of a projected computing application associated with the projected computing interaction.

24. The one or more non-transitory, computer-readable storage media of claim 20, wherein to determine the projection surface based on the usability factor comprises to determine the projection surface based on a visibility feature of the projection surface.

25. The one or more non-transitory, computer-readable storage media of claim 20, wherein to present the target location comprises to project an indicator of the target location at the target location using the projector.

\* \* \* \* \*